United States Patent [19]

Keearns

[11] Patent Number: 4,558,418
[45] Date of Patent: Dec. 10, 1985

[54] LEADING EDGE ESTIMATOR FOR NAVIGATION SYSTEM

[75] Inventor: Larry R. Keearns, Dallas, Tex.

[73] Assignee: E-Systems, Inc., Dallas, Tex.

[21] Appl. No.: 491,925

[22] Filed: May 5, 1983

Related U.S. Application Data

[62] Division of Ser. No. 248,803, Mar. 30, 1981, Pat. No. 4,495,580.

[51] Int. Cl.⁴ ............................................. G06F 15/50
[52] U.S. Cl. .................................... 364/450; 364/449; 244/180
[58] Field of Search ............... 364/433, 434, 443, 444, 364/449, 450, 454, 460; 343/5 DP, 5 MM, 7 TA, 7 A, 7.3, 9 R, 10, 12 A, 357, 451; 244/3.15, 3.2, 175, 180, 195; 73/178 R; 340/974, 988; 358/135, 136; 367/88; 375/28

[56] References Cited

U.S. PATENT DOCUMENTS

| | | | |
|---|---|---|---|
| 3,176,119 | 3/1965 | Deschumps | 364/581 |
| 4,016,565 | 4/1977 | Walker | 343/7 TA |
| 4,103,847 | 8/1978 | Thomas et al. | 364/433 |
| 4,117,538 | 9/1978 | Shrader et al. | 364/581 |
| 4,144,571 | 3/1979 | Webber | 364/450 |
| 4,176,337 | 11/1979 | Aechter et al. | 343/7 A |
| 4,218,703 | 8/1980 | Netravali et al. | 375/28 |
| 4,224,669 | 9/1980 | Brame | 364/460 |

Primary Examiner—Errol A. Krass
Assistant Examiner—Donna L. Angotti
Attorney, Agent, or Firm—Albert M. Crowder, Jr.

[57] ABSTRACT

A leading edge estimator for a vehicle terrain navigation system is described, the system having a radar terrain sensor which generates a position signal. The leading edge estimator includes a storage circuit for storing a time of arrival signal estimate. A delay circuit receives the position signal from the radar terrain sensor and produces a delayed version thereof. The position signal and the delayed version thereof are differenced and applied to a sample & hold circuit, which generates a sample of the differenced signal after a predetermined time period. The output of the sample & hold circuit is then applied to a one bit analog-to-digital convertor which determines the sign of the sampled difference signal. The output of the analog-to-digital convertor is then used as a control signal to effect the gating of one of two predetermined weighting factors. The estimator also includes an adder, connected to receive the selected weighting factor, for summing the weighting factor with the time of arrival signal estimate to generate an up-dated time of arrival signal estimate.

4 Claims, 5 Drawing Figures

LEADING EDGE ESTIMATOR FOR NAVIGATION SYSTEM

This is a division of application Ser. No. 248,803 filed Mar. 30, 1982 now U.S. Pat. No. 4,495,580.

TECHNICAL FIELD

This invention relates to a navigation system, and more particularly to a system for locating the position of a vehicle, movable over a surface which varies in elevation, as it moves along a navigation path.

BACKGROUND ART

In the past several years, tremendous strides forward have been taken in the field of navigational dead reckoning techniques. Among recent developments in this field have been the introduction of computers and the development of velocity, acceleration, and direction sensing devices of high accuracy. However, despite the tremendous advances made in dead reckoning guidance systems employed for bringing a craft or vehicle precisely to a certain geographic location, a fix-taking correctional guidance system must still be used in conjunction with the dead reckoning system because of the characteristic accumulation of dead reckoning error in the latter, if high accuracy of navigation is required.

Generally speaking, the reference data necessary for use in a correctional system can be derived by several techniques and from a variety of sources. Two common methods use celestial observation and the recognition of some earth-fixed parameter. While stellar monitoring can usually be satisfactorily employed at high altitudes, several factors prevent its use in high-speed, low-altitude vehicles. First, weather and cloud cover impose operational limitations in land and air vehicles and in vessels operating at and near the surface of water. Secondly, a turbulent boundary layer is formed during low and medium altitude flights of aerial vehicles which cause image diffusion and defraction and therefore a corresponding degradation in accuracy. Obviously, optical observation of stellar bodies is not readily practicable, in the case of a vessel traveling deep beneath the surface of a body of water, for providing stellar reference data for fix-taking.

One earth fixed parameter data source is topographic information. Many guidance systems were devised in the past which, at least in aircraft, made use of topographic information as reference data for fix-taking. Some of these systems made use of radar derived topographic data, and large efforts were expanded in developing radar map matching techniques. Systems of this type have been in existence for some years, but have never been completely satisfactory because of, primarily, their high degree of complexity.

It will be understood that, as employed herein, the term "navigation" refers to the conducting of aircraft and ships from place to place and further is intended to refer, and expressly does refer, to the conducting of any other body from place to place. Thus, while the specific example provided herein is in connection with an aircraft as the vehicle, the sequence of elevations, relative to some fixed reference, from one to the other along a given series of discrete points on the ocean bottom is as unique as along a similar series of points on land, and the elevation sequence along a series of spaced points on land is no less unique when the points are passed over by a land-contacting vehicle than when flown over by an aircraft. The invention, therefore, is specifically applicable also to the navigation of submarine vessels and land vehicles and, in fact, of any body which moves over a surface, the earth's crust being one example thereof, whose altitude varies from place to place with reference to a given altitude datum. While, in the specific example, altimeters are referred to as preferred means for determining both the absolute altitude of an aircraft relative to a reference datum and the height of the aircraft above the earth, the invention is by no means limited to the use of such instruments and its scope is such as to include, in other applications, the use of fathometers and/or pressure-sensing devices giving information indicative of the altitude of the earth's crust and specifically the interval separation a vessel from the ocean bottom and/or surface.

While the term "terrain" ordinarily has been employed, in the past, with references to land areas, it is expressly adopted and employed herein as a term referring to any surface area, such as that of the earth's crust, whether that area be covered with water or air.

Previously proposed fix-taking and navigational systems have sought to utilize terrain elevation data, and they have been based upon the analog comparison of sample data, which are the continuous, analog representation of continuous variations in terrain elevations, with similar data contained in contour maps employed as such. At least some of the sample and known data hence have always been graphically or photographically displayed on actual sheets of paper, rectangles of photographic film, etc., and the values represented thereby have been shown as physically measurable along at least two axes. Because of the nature of the data employed, cumbersome and unwieldy equipments for photographic development, superposition of map over map, orthogonal adjustments of one set of data relative to another, etc. have been unavoidable sources of added weight, complexity, error and malfunction.

One significant improvement of such analog comparison systems is described in U.S. Pat. No. 3,328,795 which does not employ continuously recorded, analog data, but has as one of its bases the use of quantized terrain altitude information taken at discrete points. A numerical comparison of sample and prerecorded data is performed at high speed, and with results predictable and repeatable for the same inputs, by a digital computer. Since the digital computer and associated components are relatively unaffected by noise, vibrations, nuclear radiation, etc., no equipment is required for performing two-dimensional data comparisons, and no feedback or nulling circuitry is needed for determining the point of best physical correlation of the sample with the prerecorded data. As distinguished from systems utilizing analog information, the digital computer is free from the sources of error unavoidably present where analog comparisons are made and hence is not only more accurate but is able to tolerate relatively large errors in sample and known data values without compromising fix-taking accuracy.

Basically the navigation system as described in U.S. Pat. No. 3,328,795 involved the lifting of the contour signature of the prospective navigation region or regions, from available sources such as contour maps or stereo photos. As a vehicle proceeds over the navigation region, a sensor system measures the contour signature of a terrain sample along the vehicle navigation track. As described in U.S. Pat. No. 3,328,795, the terrain sample is nominally five miles in length to obtain uniqueness and it can be curved or straight. The sample of the measured contour signature from along the navigation track is trial-matched with stored terrain signatures of similar samples from all over the navigation region. The objective of the matching is to determine the location within the navigation region from which the sample of measured navigation track signature was taken. When a best match is determined, the navigation system of U.S. Pat. No. 3,328,795 position fixes within the region and the system updates a dead reckoning navigation subsystem in appropriate coordinates.

An improvement over the navigation system of U.S. Pat. No. 3,328,795 is described in U.S. Pat. No. 4,144,571 and utilizes an update of vehicle position data on a point by point basis. At each terrain measurement, the vehicle position and vehicle velocity data are updated such that the updated data is equal to the previous data, plus the movement of the vehicle due to a measured velocity, plus movement due to a bias in the velocity measurement, plus a characteristic error term. In computing the updated data in U.S. Pat. No. 4,144,571, ground clearance measurements and measurements of absolute altitude above a reference are compared with stored reference data at the predicted vehicle position. As distinguished from a terrain path comparison technique, three vehicle position measurements and three vehicle velocity measurements are updated at each data sample using recursive computation techniques based on past measurement data.

An ideal fix-taking navigation system should possess operational flexibility and should perform satisfactorily where nuclear radiation or other adverse environmental and/or flight conditions exist. Moreover, the system should preferably possess the attributes of simplicity, accuracy, and reliability and desirably should be compact and light-weight.

A fix-taking navigation system should possess additionally the ability to operate independently of the linearity or nonlinearity of the vehicle path and without previous knowledge of the vehicle movement as this may unexpectedly vary in flight.

SUMMARY OF THE INVENTION

In accordance with the present invention, apparatus for estimating the leading edge of a radio return pulse for a vehicle through a navigation system includes circuitry for generating terrain height data representing the vehicle height above the terrain over which the vehicle is traveling. This data is input to system hardware for generating an enable pulse which is connected to circuitry for weighting a previously generated time-of-arrival pulse with a weighting factor. The weighting factor is summed with a previously generated time-of-arrival pulse to generate an up-dated time-of-arrival pulse.

BRIEF DESCRIPTION OF THE DRAWINGS

A more complete understanding of the invention and its advantages will become apparent from the following description when read in light of the accompanying drawings.

Referring to the drawings.

DETAILED DESCRIPTION

Vehicle navigation in accordance with the present invention is accomplished by a system that determines the velocity and position of a vehicle with respect to a sequence of reference data representing a reference map $h_z(x,y)$ that may be stored in a number of ways. Heretofore, the reference map was stored as a rectangular array which can be described as a two-dimensional bar graph. The stored discrete data items relate to variations in elevation of the terrain relative to a reference datum. The individual discrete data items are stored as the mathematical function $h_z(x,y)$ and represent measurements of elevation variation of a surface area and form a unique pattern to identify the velocity and position of a vehicle along a navigation track. There are alternate ways of utilizing this stored data, one utilizing a method of interpolation to evaluate the terrain between grid points and the other using no interpolation. Use of interpolation improves the accuracy of the output data. Another technique for computing velocity and position of a vehicle is to store the terrain map as a mathematical function. This is the technique that will be described hereinafter which enables construction of the reference map $h_z(x,y)$ as the sum of orthogonal functions. The functional form used is a discrete cosine transform (DCT) as given by the expression:

$$h_z(x,y) = \sum_{m=0}^{4} \sum_{m=0}^{4} b_{mn} \cos(mw_x x) \cos(nw_y y) \quad (1)$$

This functional form enables the generation of a wide variety of "terrain-like" surfaces. The accuracy desired when utilizing the expression above varies with the number of terms in the equation. By utilizing this technique, data representing the entire rectangular grid need not be stored but instead it is only required to store the coefficients of the sum of the orthogonal function. These coefficients ($b_{mn}$) are computed from a least squares fit of the expression $h_z(x,y)$ to the rectangular grid elevation data provided by distance measuring apparatus. Thus instead of storing many terrain elevation data points in a rectangular grid it is only necessary to store 20 or 30 values of the coefficient $b_{mn}$ and compute the terrain map function $h_z(x,y)$ whenever it is needed to compute the terrain elevation at a point (x,y).

Figure 1:
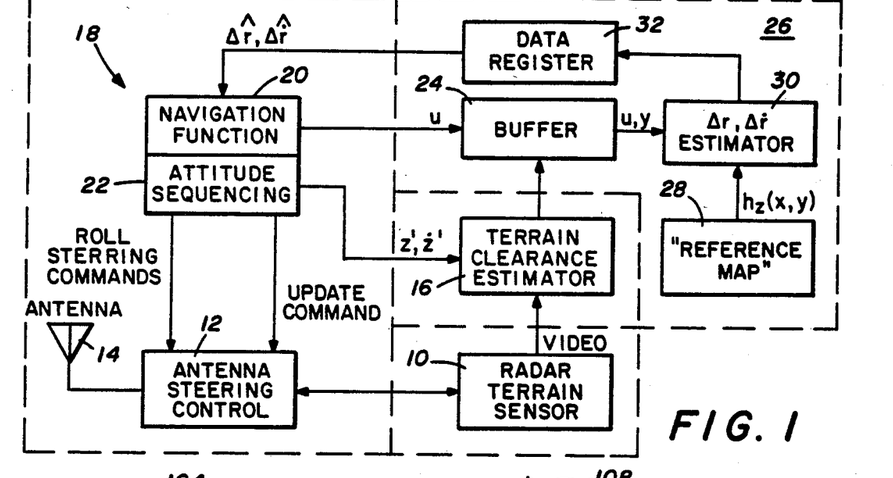
FIG. 1 is a block diagram of one embodiment of a vehicle navigation system in accordance with the present invention.

Referring to FIG. 1, there is shown one embodiment of a navigation system including a conventional radar terrain sensor 10 connected through an antenna steering control 12 to a conventional radar antenna 14. As a vehicle enters a reference field the radar terrain sensor 10 begins to transmit and receive pulses which are processed into video output signals that are applied to a terrain clearance estimator 16. The terrain clearance estimator 16 processes the video output signals (returns) to generate output data representing a running account of terrain clearance with respect to a reference datum, i.e., a vehicle.

Vehicle position is measured by an inertial navigation system 18 including a navigation function controller 20 and a TFS attitude sequencing control 22. The attitude sequencing control 22 generates roll steering commands and update commands to the antenna steering control 12 for positioning of the antenna 14. At periodic intervals the vehicle position as measured by the inertial navigation system 18 is applied to a buffer 24 as part of a computational processor 26. Altitude signals and vertical velocity signals from the sequencing controller 22 from the inertial navigation system are input to the terrain clearance estimator 16. The output of the terrain clearance estimator 16 is sampled periodically along with the output of the navigation function controller 20 and stored in the buffer 24. By the sampling technique the vehicle position samples and the terrain clearance estimator samples are stored as signal "pairs" in the buffer 24.

With reference to the inertial navigation system 22, such a device is more thoroughly described in U.S. Pat. No. 4,144,571 and generates steering commands to a conventional control unit. Typically, the control unit may be a conventional autopilot for providing steering to a vehicle along a desired navigation path. Because of the conventional aspects of the navigation system 18 further detail of such system is not considered necessary for a full understanding of the present invention.

Data "pairs" in the buffer 24 are utilized by the computational processor 26 in a correlation process which begins at the end of a subsequent data run. As illustrated, the computational processor 26 includes the reference map function $h_z(x,y)$ data storage 28 which contains prerecorded terrain coefficient data. This coefficient data, which is output from the storage 28 as a function of vehicle position in Cartesian coordinates is input along with a data pair from the buffer 24 to a position and velocity error estimator 30. By means of an iterative process the error estimator 30 updates values of position and velocity error estimates for a vehicle with each iteration stored in a data register 32. These updated values are then accessed by the inertial navigation system 18 on an as-needed basis. Typically, the estimator will achieve acceptable accuracy of position and velocity correction after approximately 20 iterations although it continues to function in order to obtain greater accuracy until a vehicle reaches an identified destination.

Operationally, the system of FIG. 1 becomes operational by initializing the inertial navigation system 18 at the time the vehicle leaves a starting or take-off point. Assuming that the take-off point is known without error then at the starting time, $t_0$, the output of the inertial navigation system 18 may be assumed to be without error. However, errors build up in the inertial navigation system as the vehicle follows its assigned path. As a result, by the time the vehicle arrives in the vicinity of its destination an unacceptable uncertainty in the position and velocity of the vehicle as measured by the inertial navigation system has developed. In accordance with the present invention, the system of FIG. 1 corrects this error by taking observations of the terrain within the specified area defined by the reference map function in the storage 28 prior to the arrival of the vehicle at its destination. These observations are processed to generate position correction estimates, $\Delta \hat{r}$, and velocity correction, $\Delta \hat{r}$ which are accessed by the inertial navigation system to provide corrected position and velocity signals for the inertial navigation system output.

For purposes of further description, assume that the path of the vehicle from its starting position to its destination can be divided into three time segments: $(t_0, t_1)$, $(t_1, t_k)$, and $(t_k, t_f)$, where:

$t_0$ is the starting time, $t_1$ is the time at which the first observation of the terrain is taken as the vehicle approaches its destination, $t_k$ is the time at which the final terrain observation is taken before the vehicle reaches its destination, and $t_f$ is the time at which the vehicle arrives at its destination.

Typically, the time interval from $t_0$ to $t_1$ is very much larger (several thousands of seconds) than the interval $t_1$ to $t_f$ (which may be less than 15 or 20 seconds). Thus it may be assumed that approximately all the error built up in the inertial navigation system 18 occurs prior to time $t_1$, and that the error built up in the interval from time $t_1$ to time $t_f$ is relatively small.

This may be more precisely defined if the vehicle destination is used to specify the origin of a Cartesian coordinate system in which it is desired to know the position and velocity of a vehicle. If the terms $r(t)$ and $\dot{r}(t)$ represent the actual position and velocity, respectively, of a vehicle at time $t$ in this coordinate system and the position and velocity of the vehicle as measured by the inertial navigation system are given by the terms $\mu(t)$ and $\dot{\mu}(t)$, respectively, and if it is further assumed that if the vehicle position at the starting point is known without error, then at the starting time, $t_0$, the output of the internal navigation system is error free and is given by the expressions:

$$\mu(t_0) = r(t_0), \text{ and} \qquad (2)$$

$$\dot{\mu}(t_0) = \dot{r}(t_0). \qquad (3)$$

As the vehicle moves along its assigned path to its destination errors are built up in the output of the inertial navigation system 18 so that at time $t_1$ a position error, $\Delta r$, and a velocity error, $\Delta \dot{r}$, will be present as given by the expressions:

$$\Delta r = r(t_1) - \mu(t_1), \text{ and} \qquad (4)$$

$$\Delta \dot{r} = \dot{r}(t_1) - \dot{\mu}(t_1). \qquad (5)$$

Proceeding on the assumption that the error accrued to the inertial navigation system during the interval from time $t_1$ to $t_f$ is relatively small, then during this interval the actual position and velocity of a vehicle is related to the output of the inertial navigation system by the equations:

$$r(t) = \mu(t) + \Delta r + \Delta \dot{r}(t - t_1) \qquad (6)$$

$$\dot{r}(t) = \dot{\mu}(t) + \Delta \dot{r} \qquad (7)$$

These equations reveal that the corrected position and velocity of the vehicle ($r(t)$ and $\dot{r}(t)$) can be computed independently of the form of $\mu(t)$ and $\dot{\mu}(t)$, that is, independent of the "shape" of the trajectory as indicated by the navigation system. Hence, there is no limitation that the vehicle path be linear. Also, it is not necessary to alter the method for constructing the corrected navigation signals for curvilinear paths.

With reference to these two equations the computational processor 26 provides the position error, Δr, and the velocity error, Δṙ, in the data register 32 for access by the inertial navigation system. Thus, the computational processor 26 outputs two three-dimensional vectors defining Δr and Δṙ as input to the data register 32. The computational processor 26 generates these vectors given the terrain elevation map as stored in storage 28, a terrain clearance history from the clearance estimator 16 and position output signals from the inertial navigation system 18.

Figure 2:
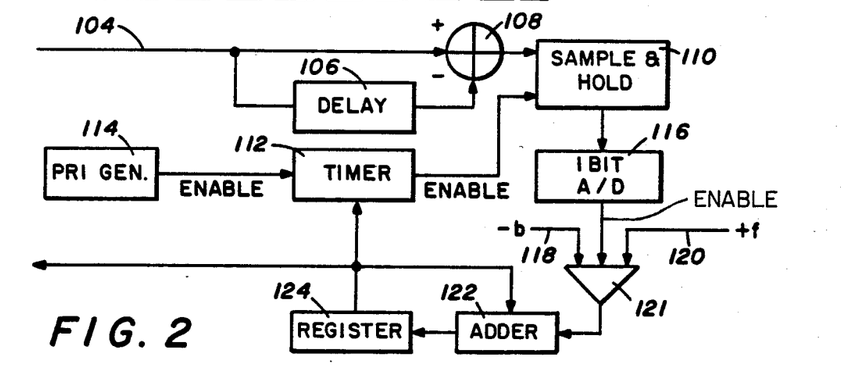
FIG. 2 is a block diagram showing one implementation of a leading edge estimator for the system of FIG. 1.

Referring to FIG. 2, there is shown a block diagram of a leading edge estimator as part of the terrain clearance estimator 16 wherein the clearance of the terrain at any time is determined from a running account of the time of arrival data using the relationship between distance and time characteristics of the radar system including the sensor 10. The function of the leading edge estimator of FIG. 2 is to track the earth's surface by estimating the times of arrival of the radar returns to the sensor 10. The input to the time of arrival estimator on a line 104 is a video output Sn(t) of the radar terrain sensor 10 at the time of the $n^{th}$ radar return. The video output of the sensor 10 is fed through a delay line 106 of length " " and differenced in a summing junction 108 to obtain a continuous output that is applied to a sample and hold network 110. The quantity in the sample and hold circuit 110 is accessed by an enable signal from a timer 112 that is in turn enabled by the output of a pulse repetition interval generator 114. The pulse repetition interval generator 114 enables the timer 112 which runs for a preselected number of seconds at which time it sends the enable signal to the sample and hold circuit 110. The value in the sample and hold network 110 is applied to a one bit analog-to-digital converter 116 to determine the sign of the value. The output of the analog-to-digital converter 116 then acts as an enable pulse to determine whether a "−b" signal on line 118 or a "+f" signal on line 120 is fed, by gate 121, to an adder 122 to be summed with a previous time of arrival estimate signal as stored in a register 124. The new estimate of the time of arrival is then stored in the register 124 and replaces the previously stored value. The estimate in the register 124 is accessed as needed for processing with the output of the inertial navigation system 18 as sampled and stored in the buffer 24.

Figure 3:
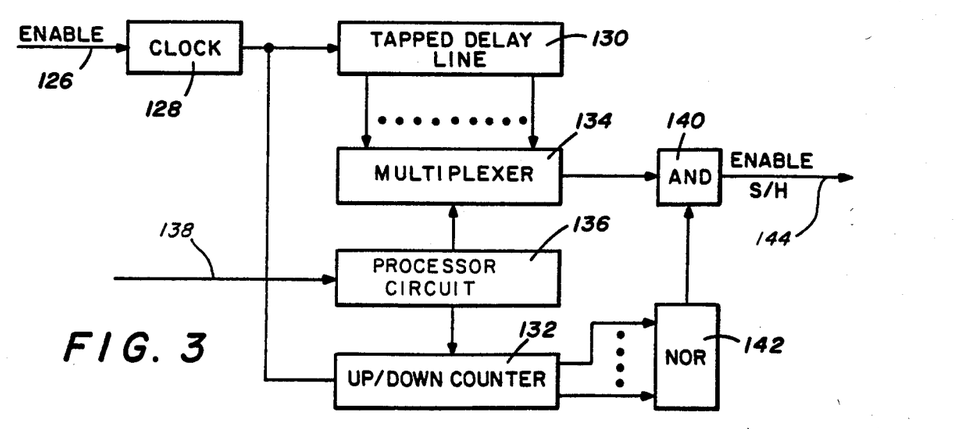
FIG. 3 is a block diagram of an implementation of a clocking and timing circuit for the timer of FIG. 2.

Referring to FIG. 3, there is shown a block diagram of one implementation of the timer 112 of the time of arrival estimator of FIG. 2. The time of arrival estimator of FIG. 2 includes a conventional sample and hold network, an analog-to-digital converter, an adder, and a register along with a PRI generator and delay line. Timer 112, as detailed in FIG. 3, functions by receiving as an input from the PRI generator 114 an enable signal on a line 126. This enable signal actuates a clock 128 having an output applied to a tapped delay line 130 and to an up-down counter 132. Each output terminal of the delay line 130 is tied to a multiplexer 134 that also is connected to a processor circuit 136. The processor circuit 136 in turn connects to the up-down counter 132 and receives as an input on a line 138 the most recent estimate of time of arrival value as stored in the register 124 of FIG. 2.

Connected to the output of the multiplexer 134 is an AND gate 140 having a second input connected to an input of a NOR gate 142 gate 142 having inputs connected to the up-down counter 132. By operation of the AND gate 140 an enable signal is generated on a line 144 to enable the sample and hold network 110 of FIG. 2.

Operationally, the timer of FIG. 3 receives an enable pulse from the PRI generator 114 and accesses the register 124 for the most recent estimate of the time of arrival. With these two outputs the timer generates the enable signal to sample the value of the differenced video radar return stored in the network 110. Operation of the sample and hold network 110 in the time of arrival estimator has been previously described with reference to FIG. 2.

Turning next to the radar terrain sensor operation along with the time of arrival estimator of FIG. 2 in the terrain clearance estimator 16 to generate observed terrain clearances it will be assumed that as a vehicle moves over the reference map field a total of K measurements of the terrain (K may nominally be 100 samples) are taken. Considering a nominal pulse repetition frequency for the terrain sensor 10 of 10 KHz and a data run of typically 2.5 seconds, then a total of 25,000 radar returns from the terrain are obtained by the sensor 10. An observation of terrain clearance is made by measuring the time of arrival of a return pulse in the time of arrival estimator of FIG. 2. If the estimated time of arrival of the nth pulse transmitted at time $t_n$ is denoted by the $\tau_n$ then the observed terrain clearance is computed in the estimator 16 in accordance with the expression:

$$Y(t_n) = \frac{C\hat{\tau}_n}{2}, \quad n = 1, \ldots, 25{,}000 \tag{8}$$

where:
$Y(t_n)$ = a value of terrain clearance, and
C is the speed of light.

If only 100 observations (samples) of terrain clearance are to be used by the processor 26 to estimate position error, Δr, and velocity error, Δṙ, and assuming these observations are equally spaced in time, then the terrain clearance estimator 16 provides an output to the buffer 24 in accordance with the expression:

$$Y(t_m) = \frac{C\hat{\tau}_{250K}}{2}. \tag{9}$$

This expression relies on the time of arrival estimate as stored in the register 124 which has been generated in accordance with a time of arrival estimation algorithm defined by the expression:

$$\hat{\tau}_{n+1} = \begin{cases} \hat{\tau}_n - b, & \text{if } S_{n+1}(\hat{\tau}_n) < S_{n+1}(\hat{\tau}_n + \delta) \\ \hat{\tau}_n + f, & \text{otherwise} \end{cases} \tag{10}$$

where a weighting function has been incorporated as evidenced by the constants "−b" and "+f" as input to the gate 121.

Figure 4:
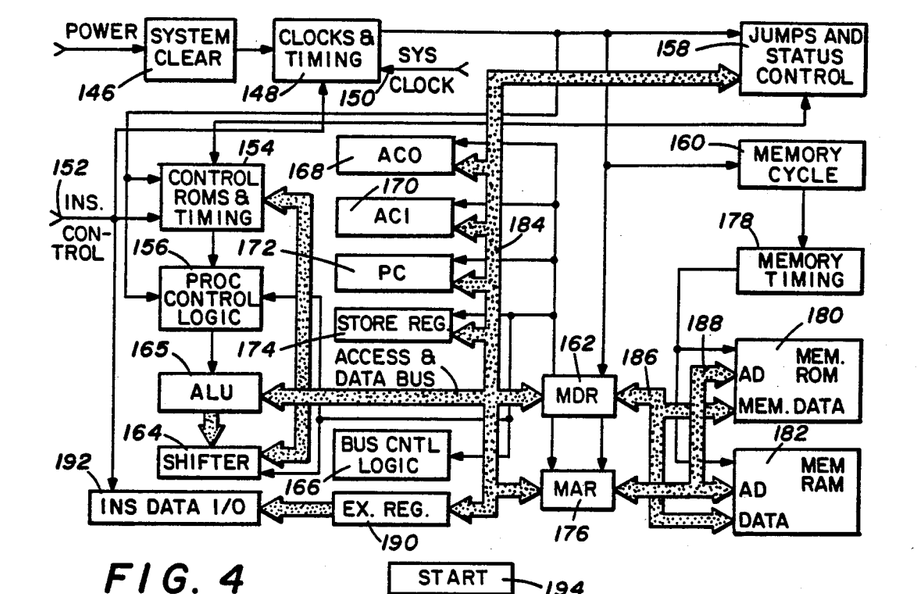
FIG. 4 is a functional diagram of the computational processor of FIG. 1.

Referring to FIG. 4, there is shown a hardware implementation of the computational processor 26 which at the completion of a data run for storing data in the buffer 24 begins an iterative operation to update values of the position and velocity error estimates (Δr̂, Δṙ̂). Basically, the computational processor 26 is a 16 bit (word size) mini-computer capable of performing the arithmetic of an algorithm to be described with reference to FIG. 5. In one implementation of the system of the present invention, the computational processor 26 includes a National Semiconductor IMP-16C mini-computer which is a general purpose 16 bit machine that performs 2's complement arithmetic. This mini-computer is microprogrammable and performs double word arithmetic. The design uses mostly basic TTL integrated circuits with MOSLSI chips for the registers and arithmetic logic unit and the control read only memory. System power is applied to clear logic 146 to control a clock and timing circuit 148 that receives system clock pulses on a line 150. Also input to the clock and timing circuit 148 is an INS control signal on a line 152.

Clock signals generated by the clock and timing circuit 148 are provided to ROMs and timing control 154, process control logic 156, status control 158, a memory cycle register 160, and MDR logic 162. Control signals for the MDR logic 162 are also provided to the process control logic 156 and in addition are applied to a shift register 164, bus control logic 166, accumulator registers 168 and 170, and a pointer controller 172. In addition, the control signals from the MDR logic 162 are applied to a storage register 174 and MAR logic 176.

Control signals from the memory cycle register 160 are input to a memory timing register 178 which generates timing pulses to a memory ROM 180 and a memory RAM 182. Data is transferred between various component parts of the computational processor 26 during operation thereof on data busses 184, 186 and 188. Data is also transferred between an external register 190 and an inertial navigation system data input/output register 192. The INS register 192 also receives the INS control signals on the line 152 which are also applied to the ROMs and timing control 154.

Figure 5:
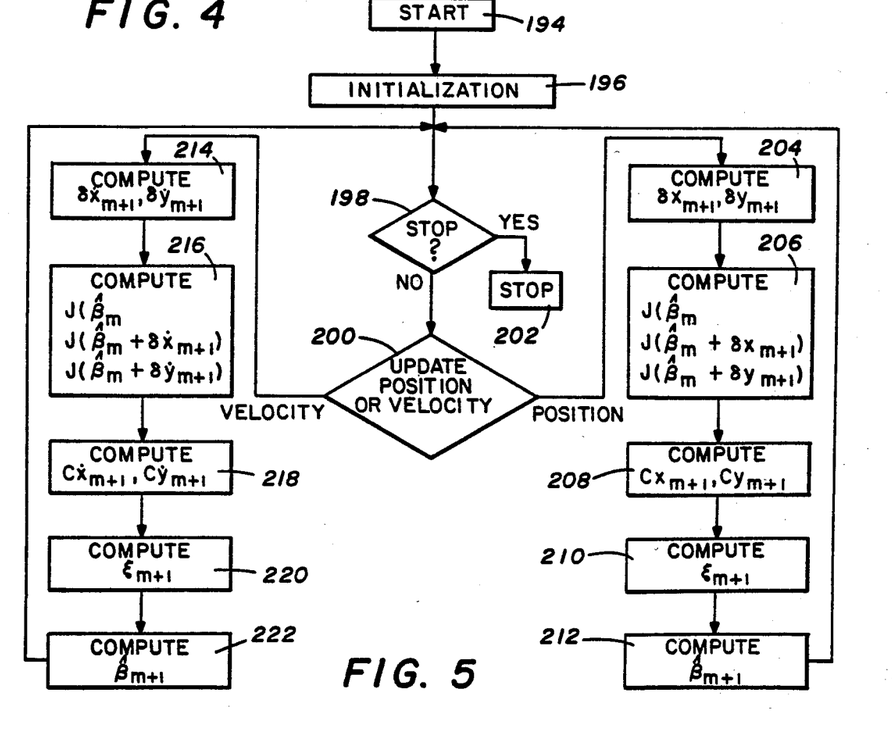
FIG. 5 is a flow chart of the error estimation algorithm for generating position correction and velocity correction signals for the inertial navigation system of FIG. 1 in accordance with the functional diagram of FIG. 4.

Referring to FIG. 5, operation of the computational processor 26 will be explained with reference to the detailed flow chart where a computation begins at the completion of a data run at a start sequence 194. The system is initialized at 196 and an instruction is run at 198 to test if the sequence is to stop with a positive response or proceed to an update position and velocity sequence 300. The stop sequence is illustrated at 202.

Because the position error of the inertial navigation system is expected to be much larger than the velocity error the first few iterations of the operation of the computational processor 26 will be to minimize the position error. Thus at the inquiry sequence 200 the first response will be a position iteration.

Prior to detailing the position or velocity error computations from the flow chart of FIG. 5 a description of the position and velocity error estimation algorithm will be presented. Estimate of the position and velocity errors, $\Delta \hat{r}$ and $\Delta \hat{\dot{r}}$, are calculated to minimize the expression:

$$R(\Delta \hat{r}, \Delta \hat{\dot{r}}) = \sum_{k=1}^{K} [Y(t_k) - \hat{Y}(t_k)]^2 \qquad (11)$$

where:

$Y(t_k)$ is the observed terrain clearance at time $t_k$, and
$\hat{Y}(t_k)$ is the predicted value of the terrain clearance at time $t_k$ for the position and velocity errors given by $\Delta \hat{r}$ and $\Delta \hat{\dot{r}}$.

From the above the predicted terrain clearance, $\hat{Y}(t_k)$ is provided in accordance with the expression:

$$\hat{Y}(t_k) = \hat{z}(t_k) - h_z(\hat{x}(t_k), \hat{y}(t_k)) \qquad (12)$$

where $$\begin{pmatrix} \hat{x}(t) \\ \hat{y}(t) \\ \hat{z}(t) \end{pmatrix} = \hat{r}(t) = u(t) + \Delta \hat{r} + \hat{\dot{r}}(t - t_1), \qquad (13)$$

$h_z(t)$ is the sensor viewed "terrain elevation" computed at the nominal vehicle altitude z, and u(t) is the vehicle position at time t as measured by the inertial navigation system 18.

With appropriate substitutions the expression for $R(\Delta \hat{r}, \Delta \hat{\dot{r}})$ becomes:

$$R(\Delta \hat{r}, \Delta \hat{\dot{r}}) = \qquad (14)$$

$$\sum_{k=1}^{K} [Y(t_k) - z'(t_k) - \Delta \hat{z} - \Delta \hat{\dot{z}}(k-1)\Delta t + h_z(\hat{x}(t_k), \hat{y}(t_k))]^2$$

where $$u(t) = \begin{pmatrix} x'(t) \\ y'(t) \\ z'(t) \end{pmatrix}$$

$$\Delta \hat{r} = \begin{pmatrix} \Delta \hat{x} \\ \Delta \hat{y} \\ \Delta \hat{z} \end{pmatrix}$$

$$\Delta \hat{\dot{r}} = \begin{pmatrix} \Delta \hat{\dot{x}} \\ \Delta \hat{\dot{y}} \\ \Delta \hat{\dot{z}} \end{pmatrix}$$

$t_k = (k-1)\Delta t$, and $t_1 = 0$.

This is a six-dimensional minimization of $R(\Delta \hat{r}, \Delta \hat{\dot{r}})$ which can be reduced to a four-dimension minimization, namely, $\Delta \hat{x}$, $\Delta \hat{y}$, $\Delta \hat{\dot{x}}$ and $\Delta \hat{\dot{y}}$.

Using equation (14) the derivatives are set equal to zero so that:

$$\Delta z(\hat{\beta}) = \frac{6}{K(K+1)} \left[ \frac{2K-1}{3} Q(\hat{\beta}) - S(\hat{\beta}) \right] \qquad (15)$$

and $$\Delta \dot{z}(\hat{\beta}) = \frac{12}{\Delta t(k-1)K(K+1)} \left[ S(\hat{\beta}) - \frac{K-1}{2} Q(\hat{\beta}) \right] \qquad (16)$$

where $$\hat{\beta} = \begin{pmatrix} \Delta \hat{x} \\ \Delta \hat{y} \\ \Delta \hat{\dot{x}} \\ \Delta \hat{\dot{y}} \end{pmatrix}, \qquad (17)$$

-continued $$Q(\hat{\beta}) = \sum_{k=1}^{K} Y(t_k) - z'(t_k) = h_z(\hat{x}(t_k), \hat{y}(t_k))$$

and $$S(\hat{\beta}) = \sum_{k=1}^{K} (k-1) [Y(t_k) - z'(t_k) + h_z(\hat{x}(t_k), \hat{y}(t_k))] \quad (18)$$

Backsubstituting these expressions for $\Delta \hat{z}$ and $\Delta \hat{\dot{z}}$ into equation (14) yields the modified residual $J(\hat{\beta})$ as:

$$J(\hat{\beta}) = \sum_{k=1}^{K} [Y(t_k) - z'(t_k) - \Delta z(\hat{\beta}) - \qquad (19)$$

$$(k-1)\Delta t \, \dot{z}(\hat{\beta}) + h_z(\hat{x}(t_k), \hat{y}(t_k))]^2.$$

To minimize $R(\Delta \hat{r}, \Delta \hat{\dot{r}})$ in $\Delta \hat{r}$, $\Delta \hat{\dot{r}}$ it is now sufficient to minimize only $J(\hat{\beta})$ in $\hat{\beta}$. Thus a six dimensional minimization has been reduced to a four dimensional minimization.

This four dimensional minimization is accomplished in the computational processor 26 iteratively so that a sequence of estimates $\hat{\beta}_m$, $m=0, 1, 2, 3, \ldots$ will be computed and made accessible to the inertial navigation system 18 along with $\Delta z(\hat{\beta}_m)$ and $\Delta \dot{z}(\hat{\beta}_m)$ for each m. The initial estimate, $\hat{\beta}_0$, of the position and velocity errors in the xy-plane is taken as 0 for each component of error. Each successive value of $\hat{\beta}_m$ is obtained by imlementing the recursive relation:

$$\hat{\beta}_{m+1} = \hat{\beta}_m + \epsilon_{m+1} \quad (20)$$

where the four dimensional correction $\epsilon_{m+1}$ is specified.

The four dimensional minimization of $J(\hat{\beta})$ is further broken down into two interrelated minimizations, one of which is in the position plane, $(\Delta \hat{x}, \Delta \hat{y})$, and the other in the velocity plane, $(\Delta \hat{\dot{x}}, \Delta \hat{\dot{y}})$. The minimization algorithm operates by alternately minimizing $J(\hat{\beta})$ through first a position error minimization and the velocity error minimization. Thus the correction term, $\epsilon_{m+1}$, has two different forms correcting for position and velocity error depending upon which error is being estimated at iteration $m+1$.

The position error in the inertial navigation system 18 is expected to be much larger than the velocity error so the first few iterations of the flow chart of FIG. 5 will be a position error minimization. Position error minimization is accomplished by letting:

$$\epsilon_{m+1} = \begin{pmatrix} cx_{m+1} \text{sgn}[J(\hat{\beta}_m) - J(\hat{\beta}_m + \delta x_{m+1})] \\ cy_{m+1} \text{sgn}[J(\hat{\beta}_m) - J(\hat{\beta}_m + \delta y_{m+1})] \\ 0 \\ 0 \end{pmatrix} \quad (21)$$

where $$\delta x_m = \begin{pmatrix} dx_m \\ 0 \\ 0 \\ 0 \end{pmatrix}, \quad \delta y_m = \begin{pmatrix} 0 \\ dy_m \\ 0 \\ 0 \end{pmatrix},$$

$cx_m$, $cy_m$, $dx_m$, $dy_m$, $m=1, 2, 3, \ldots$ are scalar sequences which decrease as m increases, and the function sgn [ ] is defined as $$\text{sgn}[x] = \begin{cases} +1 \text{ if } x > 0 \\ -1 \text{ otherwise}. \end{cases}$$

The correction factor for the mth iteration in position is obtained by examining the modified residual for three values of $\hat{\beta}$. Depending on the comparative magnitudes of the modified residual at $\hat{\beta}_m$ and $\hat{\beta}_m + \delta x_{m+1}$ the $\Delta x$ coordinate of the correction term $\epsilon_{m+1}$ is either $+cx_{m+1}$ or $-cx_{m+1}$. Likewise for the $\Delta y$ coordinate. As a result of examining these three values of $\hat{\beta}$ the estimate $\hat{\beta}_{m+1}$ can take on one of the four values.

The sequences $cx_m$ and $cy_m$ are chosen to steadily decrease so that the increment of correction decreases to insure that $\hat{\beta}_m$ eventually converges to the global minimum for $J(\hat{\beta})$. Each correction $\epsilon_m$ is successively "finer", as m increases. There are several methods for selecting these two sequences. The method employed is to count the number of sign changes, $N_x(m)$ and $N_y(m)$, in the increments of corrections and compute $cx_m$ and $cy_m$ as:

$$cx_{m+1} = 2^{-N_x(m)} cx_0 \quad (22)$$

and $$cy_{m+1} = 2^{-N_y(m)} cy_0 \quad (23)$$

The rational for doing this is that when the initial estimate $\hat{\beta}_0$ is very much different from the true value $\beta$ then the increments in correction in each of the components maintains the same sign from iteration to iteration while $\hat{\beta}_m$ moves in the general direction of $\beta$. But as $\hat{\beta}_m$ enters the neighborhood of $\beta$ the signs begin to oscillate indicating that $\hat{\beta}_m$ is repeatedly overshooting the true value $\beta$. The increments of allowable correction are then decreased so that the estimate $\hat{\beta}_m$ converges to $\beta$. Using the signs of the corrections is one method for accomplishing this end.

The sequences $dx_m$ and $dy_m$ are used to sense the gradient of $J(\hat{\beta}_m)$. To avoid being diverted into insignificant local minima the process starts out with rather large values (nominally 400 ft.) of $dx_m$ and $dy_m$. But as $\hat{\beta}_m$ begins to converge to $\beta$ these values are decreased so that they more accurately represent the gradient near $\beta$. The computational processor 26 uses the sequences:

$$dx_m = \frac{dx_0}{m} \quad m = 1, 2, \ldots \quad (24)$$

and $$dy_m = \frac{dy_0}{m}. \quad (25)$$

These sequences are different then for $cx_m$ and $cy_m$ in that for $\hat{\beta}_m$ in the neighborhood of $\beta$ the $dx_m$ and $dy_m$ decrease much less rapidly.

At some point in the processing of data the iterations in position error are terminated and a process begins to minimize the velocity error. The form of the correction term $\epsilon_{m+1}$ for velocity error corrections is very similar to the one for position. For velocity error:

$$\epsilon_{m+1} = \begin{pmatrix} 0 \\ 0 \\ cx_{m+1}\text{sgn}[J(\hat{\beta}_m) - J(\hat{\beta}_m + \delta x_{m+1})] \\ cy_{m+1}\text{sgn}[J(\hat{\beta}_m) - J(\hat{\beta}_m + \delta y_{m+1})] \end{pmatrix} \quad (26)$$

where $$\delta x_m = \begin{pmatrix} 0 \\ 0 \\ dx_m \\ 0 \end{pmatrix}, \delta y_m = \begin{pmatrix} 0 \\ 0 \\ 0 \\ dy_m \end{pmatrix}$$

and $c\dot{x}_m$, $c\dot{y}_m$, $d\dot{x}_m$, $d\dot{y}_m$ are decreasing scalar sequences of the same form as indicated for the position algorithm.

Operation of the computational processor 26, as indicated by the sequence 200, is switched back and forth between position error estimation and velocity error estimation. The test completed at sequence 200 for determining which errors to estimate at this intersection is determined as follows:
If $$(c\dot{x}_m)^2 + (c\dot{y}_m)^2 \geq [(cx_m)^2 + (cy_m)^2](K\Delta\tau)^2 \quad (27)$$

then position error estimation is performed, otherwise velocity error estimation is performed. The left hand side of the above equation (15) is the magnitude squared of the position correction at the mth iteration and the right hand side is the magnitude squared of the equivalent position correction (when applied to the last observation) due to velocity errors. It is desirable to correct for position errors when such errors are dominant in position due to velocity and vice versa.

Proceeding with the position error estimation, a computation 204 is made to determine perturbations that are to be used to obtain an estimate of the direction of the gradient $J(\hat{\beta}_m)$ in the position ($\Delta x$, $\Delta y$) plane which is obtained in the calculation of a computation step 206. These perturbations are given by the expressions:

$$\delta \dot{x}_{m+1}, \delta \dot{y}_{m+1}.$$

Following this computation the estimation of position error advances to a computation step 206 which completes calculations for computing equations (15) through (19) as set forth previously. Next the position estimation error routine advances to a computation 208 to complete the sequences of equations (22) and (23) which are chosen to steadily decrease so that the increment of correction decreases. Position error is minimized by completing a computation 210 in the computational processor of FIG. 4 to carry out the computation of equation (21). Each successive value of the position error is obtained at a computing step 212 in accordance with the relation (20), where the four dimensional correction $\epsilon_{m+1}$ is the result of the computation 210. This position error estimation is recursively carried out by recycling through the test 200.

When the test of 200 as given by the expression (27), indicates that the next iteration is for a velocity error estimation, then the computational processor 26 as detailed in FIG. 4 calls instructions from memory to complete a computation 214 to determine the partial derivative of the "x" velocity vector and the "y" velocity vector. These partial derivatives are given by the expressions:

$$\delta\dot{x}_{m+1}, \delta\dot{y}_{m+1}.$$

Next a computation 216, which is similar to the computation 206, as given by the equations (15) to (19) is run. That is, the values are computed for the velocity error estimation. Next a computation 218 is run for the velocity vectors as given by equations (22) and (23), which is the magnitude for the correction at the mth iteration. A correction term is then computed for the velocity error at step 220 which computation is given by the equation (26). This error correction value is utilized at a computation 222 to give a velocity error estimate as given by the expression (20). This is the same expression that is run during the computation 212.

Upon completion of the computation 222 a new estimate of the velocity error has been generated and the sequence of operation of the computational processor 26, as illustrated in FIG. 4, returns to the stop inquiry 198.

The operation of the processor of FIG. 4 continues cycling through the position loop and the velocity loop to provide new estimates of position error and velocity error. These estimates are output from the estimator 30 and stored in the data register 32 for access by the inertial navigation system 18.

In the above described implementation of the present invention, there is provided a navigational system which possesses both operational flexibility and the ability to perform satisfactorily where adverse environmental and/or flight conditions exist. Furthermore, the device is simple, accurate, reliable, compact and lightweight.

While only one embodiment of the invention has been described in detail herein and shown in the accompanying drawings, it will be evident that various further modifications are possible in the arrangement and construction of the components without departing from the scope of the invention.

I claim:

1. A leading edge estimator for a vehicle terrain navigation system having a radar terrain sensor which generates a position signal, comprising:
   storage means for storing a time of arrival signal estimate;
   delay means for receiving said position signal from said radar terrain sensor and producing a delayed version thereof;
   difference means for receiving said position signal and said delayed version thereof, and in response thereto generating a difference signal;
   sampling means connected to said difference means for generating a sample of said difference signal;
   conversion means for receiving said difference signal sample and in response thereto generating an enable signal;
   gating means responsive to said enable signal for selecting one of two predetermined weighting factors; and
   adder means, connected to receive said weighting factor selected by said gating means, for summing said weighting factor with said time of arrival signal estimate to generate an up-dated time of arrival signal estimate.

2. The leading edge estimator for a vehicle terrain navigation system as described in claim 1 wherein said conversion means is a one bit analog-to-digital convertor which determines a sign bit of said difference signal sample, said sign bit serving as said enable signal.

3. The leading edge estimator for a vehicle terrain navigation system as described in claim 2 further including timing means connected to receive said time of arrival signal estimate from said storage means, and in response thereto generating a second enable signal after a predetermined time period, wherein said second enable signal generated by said timing means is used to control said sampling means.

4. A method for generating an up-dated time of arrival signal estimate for a vehicle terrain navigation system having a radar terrain sensor which generates a position signal, comprising the steps of:

storing a time of arrival signal estimate;

receiving said position signal from said radar terrain sensor and producing a delayed version thereof;

differencing said position signal and said delayed version thereof to generate a difference signal;

sampling said difference signal at a predetermined time to generate a difference signal sample;

converting said difference signal sample into a digital representation having a sign bit;

selecting one of two predetermined weighting factors in response to said sign bit; and adding said selected weighting factor to said time of arrival signal estimate to generate an up-dated time of arrival signal estimate.

* * * * *